(12) United States Patent
Nurmi et al.

(10) Patent No.: US 9,600,176 B2
(45) Date of Patent: Mar. 21, 2017

(54) METHOD AND APPARATUS FOR CONTROLLING A SPATIAL RELATIONSHIP BETWEEN AT LEAST TWO GROUPS OF CONTENT DURING MOVEMENT OF THE CONTENT

(75) Inventors: Mikko Antero Nurmi, Tampere (FI); Jouni Tapio Solismaa, Tampere (FI)

(73) Assignee: Nokia Technologies Oy, Espoo (FI)

( * ) Notice: Subject to any disclaimer, the term of this patent is extended or adjusted under 35 U.S.C. 154(b) by 151 days.

(21) Appl. No.: 13/162,200

(22) Filed: Jun. 16, 2011

(65) Prior Publication Data
US 2012/0324380 A1 Dec. 20, 2012

(51) Int. Cl.
G06F 3/0488 (2013.01)
G06F 3/0482 (2013.01)
G06F 3/0484 (2013.01)

(52) U.S. Cl.
CPC ........ G06F 3/04883 (2013.01); G06F 3/0482 (2013.01); G06F 3/04842 (2013.01)

(58) Field of Classification Search
USPC .......................................................... 715/765
See application file for complete search history.

(56) References Cited

U.S. PATENT DOCUMENTS

| | | | | |
|---|---|---|---|---|
| 5,838,317 A * | 11/1998 | Bolnick et al. | ................ | 715/764 |
| 6,043,817 A * | 3/2000 | Bolnick et al. | ................ | 715/788 |
| 8,266,550 B1 * | 9/2012 | Cleron et al. | ................ | 715/863 |
| 2003/0007015 A1 * | 1/2003 | Laffey et al. | ................ | 345/860 |
| 2003/0007017 A1 * | 1/2003 | Laffey et al. | ................ | 345/862 |
| 2005/0010599 A1 * | 1/2005 | Kake et al. | ................ | 707/104.1 |
| 2005/0068290 A1 * | 3/2005 | Jaeger | ............................ | 345/156 |
| 2006/0112354 A1 | 5/2006 | Park et al. | | |
| 2008/0155473 A1 * | 6/2008 | Duhig | ................... | G06F 3/0482 715/818 |
| 2008/0155475 A1 * | 6/2008 | Duhig | ................... | G06F 3/0482 715/830 |

(Continued)

FOREIGN PATENT DOCUMENTS

| | | |
|---|---|---|
| EP | 1 148 412 A2 | 10/2001 |
| EP | 2 207 346 A1 | 7/2010 |
| WO | WO 2007/121557 A1 | 11/2007 |
| WO | WO 2010/084602 A1 | 7/2010 |

OTHER PUBLICATIONS

Craig Danuloff, "The System 7.5 Book: Getting the Most From Your Macintosh Operating System", Third Edition, Ventana Press, 1994, pp. 26-27.*

(Continued)

*Primary Examiner* — Matt Kim
*Assistant Examiner* — Mahelet Shiberou
(74) *Attorney, Agent, or Firm* — Alston & Bird LLP

(57) ABSTRACT

A method is provided for causing a display of content with the content that is displayed being divided into at least two groups having a predefined spatial relationship therebetween. The method also enabling movement of the content and causes the spatial relationship of the at least two groups of content to change from the predefined spatial relationship while the content is moved. The method also causes the at least two groups of content to return to the predefined spatial relationship following the movement of the content. A corresponding apparatus and computer program product are also provided.

21 Claims, 8 Drawing Sheets

(56) References Cited

U.S. PATENT DOCUMENTS

| | | | |
|---|---|---|---|
| 2008/0168384 A1* | 7/2008 | Platzer et al. | 715/784 |
| 2008/0229222 A1 | 9/2008 | Kake | |
| 2010/0058182 A1* | 3/2010 | Jung | 715/702 |
| 2010/0185965 A1* | 7/2010 | Davidson et al. | 715/765 |
| 2011/0029934 A1* | 2/2011 | Locker et al. | 715/863 |
| 2011/0055773 A1* | 3/2011 | Agarawala | G06F 3/016 715/863 |
| 2011/0145027 A1* | 6/2011 | Mihai | 705/7.11 |
| 2011/0193788 A1* | 8/2011 | King et al. | 345/173 |
| 2011/0249073 A1* | 10/2011 | Cranfill et al. | 348/14.02 |
| 2012/0092438 A1* | 4/2012 | Guzman Suarez et al. | 348/14.03 |
| 2012/0120316 A1* | 5/2012 | Lee | 348/564 |
| 2012/0272171 A1* | 10/2012 | Icho et al. | 715/771 |

OTHER PUBLICATIONS

International Search Report and Written Opinion for Application No. PCT/IB2012/053011 dated Dec. 17, 2012.
The desktop (overview) Dec. 24, 2010, [online] [retrieved Dec. 11, 2012]. Retrieved from the Internet: <URL: http://windows.microsoft.com/en-US/windows-vista/The-desktop-overview>. 4 pages.
The Desktop (overview) Dec. 11, 2012, [online] [retrieved Dec. 11, 2012]. Retrieved from the Internet: URL:http://web.archive.org.web/20101224233318/http://windows.microsoft.com/en-Us/windows-vista/The-desktop-overview . . . >. 5 pages.
Supplementary European Search Report for Application No. EP 12 79 9924 dated Feb. 5, 2015.

* cited by examiner

METHOD AND APPARATUS FOR CONTROLLING A SPATIAL RELATIONSHIP BETWEEN AT LEAST TWO GROUPS OF CONTENT DURING MOVEMENT OF THE CONTENT

TECHNOLOGICAL FIELD

Some example embodiments of the present invention relate generally to user interface technology and, more particularly, relate to a method and apparatus for controlling a spatial relationship between at least two groups of content during movement of the content.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. As such, a mobile terminal may be able to access a substantial amount of content, such as photos or other images, music or video files, maps, text or other documents, games and the like. A substantial amount of the content that is accessible by a mobile terminal may be displayed for consideration by the user. In this regard, a plurality of photos or other images may be displayed, such as in an image grid. Similarly, thumbnails or other icons representative of music or video files may be displayed to facilitate selection of a respective file by the user.

Because of the amount of content that can be displayed, it may be difficult for a user to sort through and review the various content items in an efficient manner. Indeed, even in instances in which the content items have been segregated into different groups, such as groups of photographs or images from different events or different locations, music files of different genres or different artists, groups based on the alphabetic ordering of the content items or the like, the content items may be displayed in such a manner that the groupings are not well defined or are not otherwise clearly delineated. Moreover, even if delineation of the groupings might otherwise assist the user in reviewing the content items, it may be desirable in some instances for the content items to be displayed in a uniform manner without any visible definition of the various groupings.

BRIEF SUMMARY

A method, apparatus and computer program product are provided to permit two or more groups of content to be visually distinguishable while the content is moved. As such, a user may more readily identify the different groups of content which may, in turn, assist the user in reviewing the content items and, in some instances, selecting one or more content items for further consideration. A method, apparatus and computer program product of one example embodiment may visually identify at least two groups of content in such a manner that the visual identification of the groups of content provides information regarding the movement, such as the direction of movement, the speed with which the content is being movedor the like. Following completion of the movement, the visual identification of the groups of content may be eliminated such that the content is again displayed in a more uniform manner. Accordingly, devices, such as mobile terminals or other computing devices, incorporating embodiments of the method, apparatus and computer program product may facilitate the user's review of the content while the content is being moved, thereby assisting a user in selecting one or more content items for further consideration.

BRIEF DESCRIPTION OF THE SEVERAL VIEWS OF THE DRAWINGS

Figure 1:
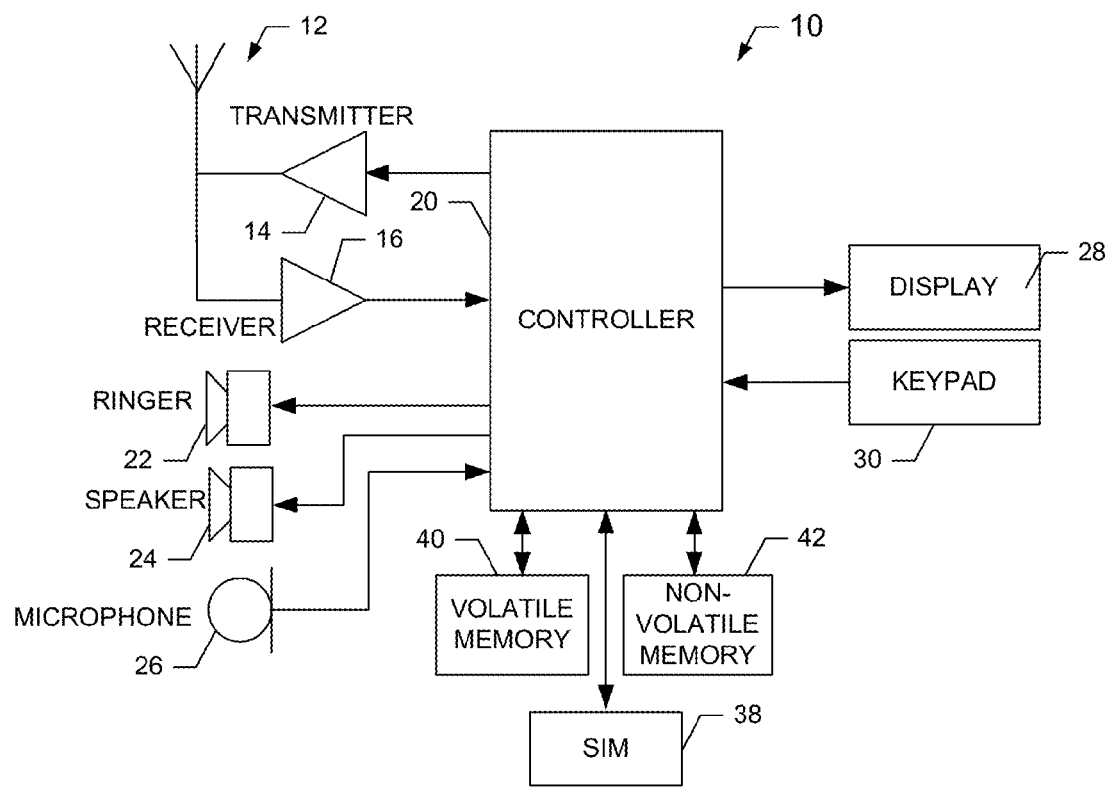
Figure 2:
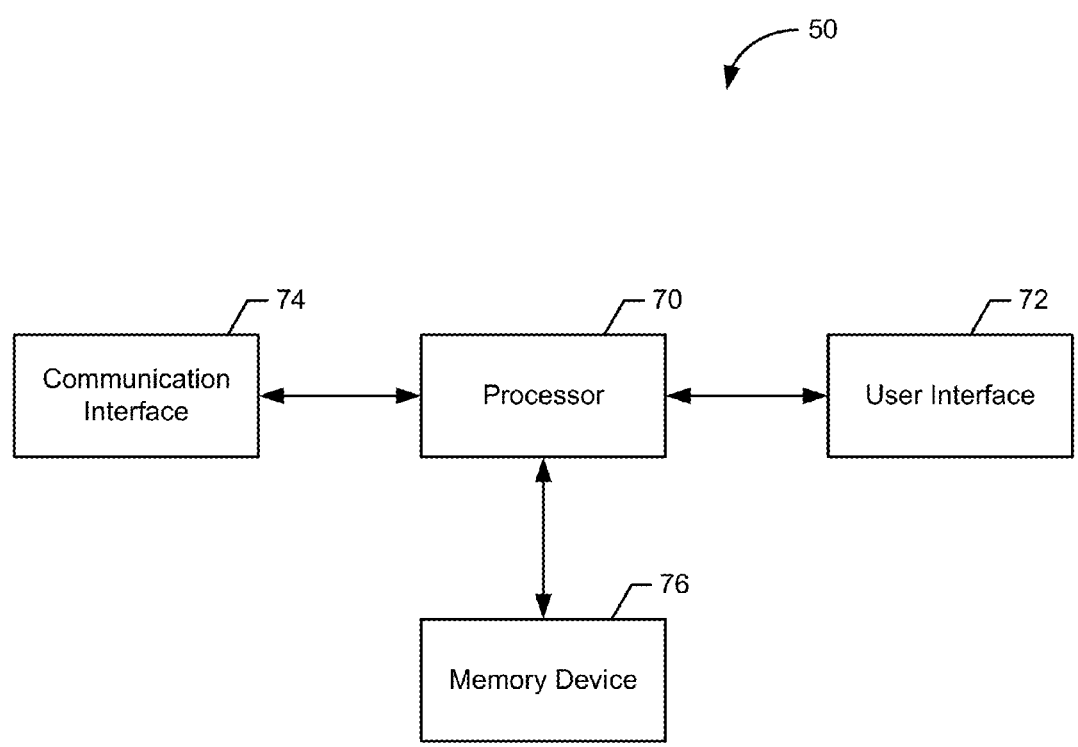
Figure 3:
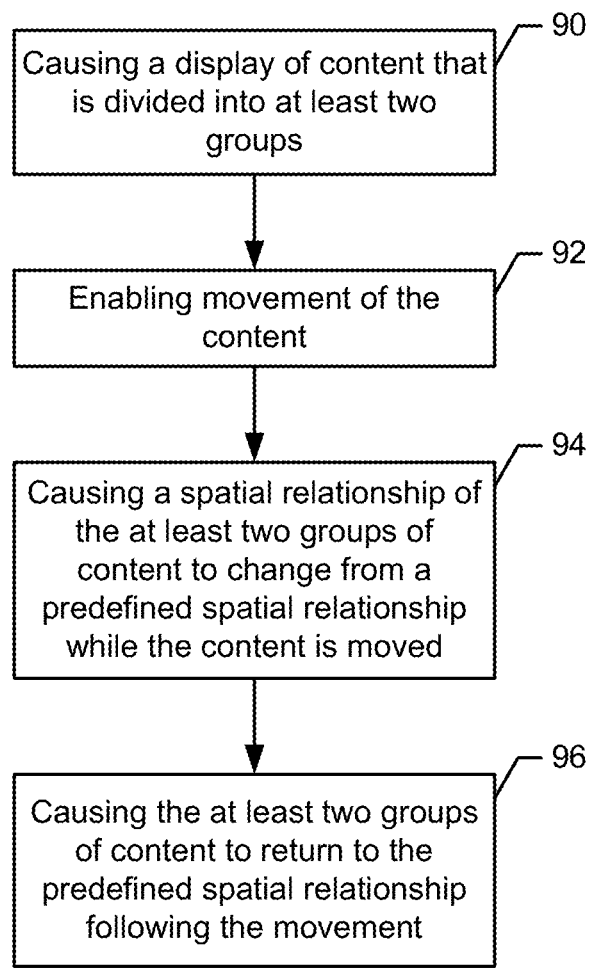
Figure 6:
Figure 7:
Figure 8:
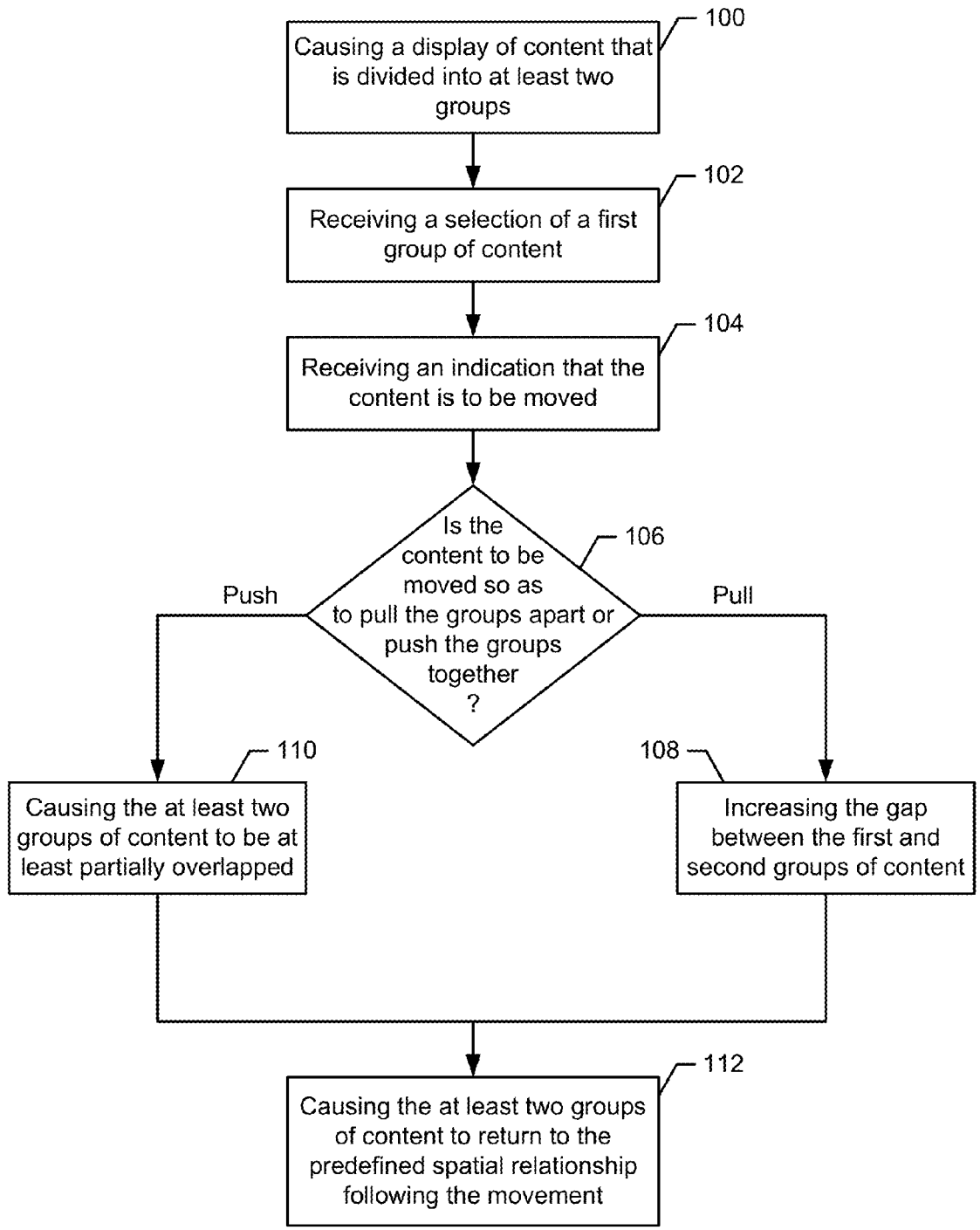

Having thus described embodiments of the invention in general terms, reference will now be made to the accompanying drawings, which are not necessarily drawn to scale, and wherein:

FIG. 1 is a schematic block diagram of a mobile terminal according to an example embodiment of the present invention;

FIG. 2 is a schematic block diagram of an apparatus for controlling a spatial relationship between at least two groups of content during movement according to an example embodiment of the present invention;

FIG. 3 is a flowchart illustrating operations performed according to an example embodiment of the present invention;

FIGS. 4-7 illustrate a plurality of screens of content items that may be presented when operating according to an example embodiment of the present invention; and FIG. 8 is a flowchart illustrating operations performed according to another example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As described below, a method, apparatus and computer program product are provided in accordance with an example embodiment for controlling the spatial relationship between two or more groups of content during movement of the content. As such, a user may more readily distinguish between the different groups of content even as the content is moved. The visible distinction between the groups of content may, in turn, assist the user in the selection of one or more content items for further consideration. Although the spatial relationship may be caused to change in various manners, the method, apparatus and computer program product of an example embodiment may cause a gap between the groups of content to increase while the content is moved in one manner and/or may cause the groups of content to be at least partially overlapped in an instance in which the content is moved in another manner. Thus, the method, apparatus and computer program product of one example embodiment may also provide information regarding the movement by changing the spatial relationship between the groups of content in different manners. Once the movement has ceased, however, the change in the spatial relationship between the groups of content that has been imposed during the movement may be eliminated such that the content is again presented in a more conventional manner.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for controlling a spatial relationship between at least two groups of content during movement are depicted. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

It should also be noted that while FIG. 2 illustrates one example of a configuration of an apparatus 50 for controlling a spatial relationship between at least two groups of content during movement, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for controlling a spatial relationship between at least two groups of content during movement is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or other computing device), such as processor 20 of mobile terminal 10 of FIG. 1, adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to cause provision of an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

Figure 4:

Referring now to FIG. 3, the operations performed by an apparatus 50 in accordance with one example embodiment of the present invention are shown. In this regard, the apparatus may include means, such as the processor 70, the user interface 72 or the like, for causing the display of content that is divided into at least two groups. See operation 90 of FIG. 3. In an instance in which the content is not being moved, the content may be displayed in accordance with a predefined spatial relationship, such as in an adjoining or contiguous relationship as shown in the illustrated embodiment. The apparatus 50 may be configured to display a wide variety of content. One example of the display of content is shown in FIG. 4. In this embodiment, the content includes the plurality of photographs or other images that are arranged and displayed in a grid-like manner. As described below, the content including the plurality of content items of FIG. 4 are divided into two or more groups. However, the content items of the embodiment of FIG. 4 are displayed without any indication of or demarcation between the groups in an instance in which the contents is not being moved. In other embodiments, however, the groups into which the content has been divided may be visually identified in some manner, even in an instance in which the content is static and not being moved. The content may be grouped in various different manners. With respect to photographs or other images, for example, the content may be grouped in accordance with the event or location represented by the photograph or other image, the style of the image, the metadata associated with the image, the importance of the image, etc. With respect to music or video files, the content may be grouped based on genre, performer, frequency with which the file is accessed or the like. As yet another example, the content of a map may be grouped in accordance with the various borders, e.g., country borders, state borders, etc. Still further, the content may be a calendar with the weeks, months and years being differently grouped.

Although the content of the embodiment of FIG. 4 includes a plurality of photographs or other images, the method, apparatus and computer program product of embodiments of the present invention may be configured to cause the display of a number of different types of content. For example, instead of photographs or other images, the displayed content may include a plurality of thumbnails or other icons representative of music files, video files, games or other applications, or the displayed content may include a list of messages, such as a list of e-mail or text messages. As another example, the displayed content may include a plurality of different types of content in a single view, such as a plurality of images and a plurality of thumbnails or other icons representative of video files mixed together. In other embodiments, the content need not include a plurality of distinct content items, but may the content from a single file or application that has been divided into different groups. For example, the content may include a map that is displayed upon the user interface 72 with the map being divided into different groups of content, such as along country lines, state lines, county lines or the like.

As shown in operation 92 of FIG. 3, the apparatus 50 of one embodiment includes means, such as the processor 70 or the like, for enabling movement of the content. The content may be moved in various manners. For example, the content may be zoomed, scrolled or the like. With respect to a scolling movement, for example, the content may be scrolled in an upward direction, a downward direction, a rightward direction, a leftward direction or in any other direction relative to the user interface 72. In regards to a user interface 72 that presents a three dimensional (3D) display, the content may be scrolled from the rear of the display toward the front of the display, that is toward the user, or vice versa. The content may also be scrolled in a nonlinear manner and, as such, may follow a curved path, such as in an embodiment in which the content is scrolled about an imaginary spherical surface. In another embodiment, the scrolling may relate to a zooming movement directed into or out of a two dimensional (2D) display of the content with the resulting display sometimes termed a 2.5D display. The apparatus 50 may be configured to receive different types of user input to direct the content movement, such as the scrolling operation. For example, the user may utilize a mouse or a touchpad to place a cursor on the content that has been displayed and may then select the content, such as by depressing a button on or associated with the mouse or touchpad. Alternatively, in an embodiment in which the user interface 72 employs touchless technology, the user may provide input by placing a finger or other body part proximate the user interface. Following selection of the content in this embodiment, the content may be moved, such as by dragging the cursor in a desired scrolling direction, such as while continuing to depress the button on or associated with the mouse or touchpad. As such, the apparatus 50, such as the processor 70, of one embodiment may cause the content to be moved in the desired scrolling direction responsive to the selection of the content and subsequent movement of the cursor in the desired direction. Alternatively, the user interface 72 may include a touch screen such that a user may simply touch the portion of touch screen upon which the content is displayed in order to select the content and may then drag their finger in the desired direction to effectuate movement in the same direction.

In accordance with an example embodiment of the present invention, the apparatus 50 may include means, such as the processor 70 or the like, for causing the spatial relationship of the at least two groups of content to change, while the content is being moved, from a predefined spatial relationship, such as the predefined spatial relationship between the groups of content while the content is static or stationary. See operation 94 of FIG. 3. In this regard, the spatial relationship between the groups of content may be changed during any movement or only during those movements that satisfy one or more predefined criteria, such as by being scrolled at a rate greater than a first predefined threshold and/or at a rate less than a second predefined threshold. In the embodiment of FIG. 4, for example, the predefined spatial relationship of the two groups of content is an adjacent or adjoining relationship with no gap between the content items of the two groups and no overlap between the content items of the two groups. In one embodiment, the apparatus 50, such as the processor 70, may require a trigger prior to causing the spatial relationship between the groups of content to change during movement of the content. Various triggers may be employed including, for example, rotation of the apparatus 50, such as a mobile terminal 10 that includes the apparatus 50, by a predefined amount, such as 10°, 20°, 90° (such as during a transition from landscape to portrait view) or the like or by providing an input in a predefined manner that causes content movement, such as scrolling. For example, tilting the mobile terminal 10 to cause the content to scroll may cause the spatial relationship between the groups of content to change during a scrolling operation, while providing a flicking gesture to initiate scrolling may not cause the spatial relationship between the groups of content to change during a scrolling operation. As described below, the movement of the content may cause the spatial relationship of the groups of content to change in various manners.

Figure 5:

As shown in FIG. 5, for example, the apparatus 50, such as the processor 70, may increase a gap, such as by creating a gap, between the groups of content while the content is moved. In this regard, the content of FIG. 5 is divided into two groups with one group including the images in the leftmost column and the upper two images in the center column and another group including the images in the rightmost column and the lower two images in the center column. While the content is moved in accordance with this embodiment, the apparatus 50, such as the processor 70, may create a gap between the two groups of content items, such as that shown by the dark band of separation between the two groups of content in FIG. 5. As such, user may be able to readily identify the different groups of content, such as content captured at different locations or at different events, and may thereafter be able to focus their attention upon the content items of one of the groups so as to increase the efficiency with which the user views the content displayed by the user interface 72, even as the content is being moved. As described below, the spatial relationship of the groups of content may be changed in other manners, such as by creating a larger or smaller gap between the two groups of content, such as shown in FIGS. 5 and 6, respectively, or by causing the two groups of content to at least partially overlap, such as shown in FIG. 7.

The apparatus 50 of one embodiment also includes means, such as the processor 70 or the like, for causing the at least two groups of content to return to the predefined spatial relationship following the movement of the content. See operation 96 of FIG. 3. In this regard, the spatial relationship between the groups of content that is changed during the movement may be eliminated such that the groups of contents return to the same predefined spatial relationship with which the content was displayed prior to the movement of the content, such as shown in FIG. 4. As such, in an embodiment in which the predefined spatial relationship of the content was such that a plurality of content items are displayed without gaps or overlap between the content, the apparatus 50, such as the processor 70, may cause the content to return to the predefined spatial relationship having no gaps or overlap following completion of the content movement. By changing the spatial relationship between the groups of content during a movement of the content and then returning to the predefined spatial relationship following completion of the movement, the resulting display of groups of content may have a rubber band-like effect. The change in the spatial relationship between the groups of content need not be an instantaneous or single step process. Indeed, the rubber band-like effect may be accentuated by gradually increasing the gap or overlap from the predefined spatial relationship exhibited by the content at rest upon commencement of the movement. Similarly, the gap or overlap that was created during the movement of the content may be gradually reduced so as to return to the predefined spatial relationship upon completion of the movement in one example embodiment.

In order to provide further details of an example embodiment that is configured to change the spatial relationship between the groups of content in different manners, reference is now made to FIG. 8. In this regard, an apparatus 50 in accordance with the embodiment of FIG. 8 includes means, such as a processor 70, user interface 72 or the like, for causing the display of content that is divided into at least two groups, such as described above in conjunction with operation 90 of FIG. 3 and as shown in operation 100 of FIG. 8. The apparatus 50 of this embodiment may also include means, such as the processor 70, the user interface 72 or the like, for receiving the selection of a first group of content. See operation 102 of FIG. 8. The first group of content that may be selected in various manners. For example, a cursor may be positioned at a selection point upon the display of the first group of content and the first group of content may then be selected, such as by depressing a button on or associated with a mouse or touchpad. Alternatively, in an instance in which the user interface 72 includes a touch screen, the user may simply touch that portion of the touch screen upon which the first group of content is displayed at a selection point in order to select the first group of content.

The apparatus 50 of this embodiment also includes means, such as the processor 70, the user interface 72 or the like, for receiving an indication that the content is to be moved in a particular direction. See operation 104. Various indications may be received indicative of the movement of the content by scrolling. In the embodiment in which the first group of content is selected by placing a cursor upon the display of the first group of content, the button that is depressed on or associated with the mouse or touchpad may remain depressed while the cursor is moved from the selection point so as to define the scrolling direction, thereby causing the content to scroll in the same scrolling direction. Alternatively, in the embodiment in which the user interface 72 includes a touch screen, the user may simply drag their finger from the selection point so as to define the scrolling direction following the selection of the first group of content in order to cause the first group of content to scroll in the scrolling direction.

In the embodiment of FIG. 8, the apparatus 50 includes means, such as the processor 70 or the like, for determining whether the content is being movedin a manner that will pull the groups of content apart or push the groups of content together. See operation 106 of FIG. 8. In this regard, the apparatus 50, such as the processor 70, may determine, relative to the selection point, whether the direction of movement is directed toward the separation or other line of demarcation that exists between the groups of content or whether the direction of movement is directed away from the separation or other line of demarcation between the groups of content. With respect to the example embodiment of FIGS. 4-7, the selection of the first group of content items and the indication that the first group of content items is to be moved upwardly and/or to the left establishes a scrolling direction that extends away from the separation between the first and second groups. Similarly, the selection of the second group of content and an indication that the second group of content is to be moved downwardly and/or to the right also establishes a direction, e.g., a scrolling direction, that also extends away from the separation between the first and second groups. As such, the groups of content are effectively pulled apart from one another by the movement of the content in this example embodiment.

Alternatively, if the first group of content items was selected and the direction of content movement was indicated to be downwardly and/or to the right, the direction of content movement would be directed toward the separation between the first and second groups of content. Similarly, if the second group of content had been selected and the direction of content movement was indicated to be upwardly and/or to the left, the direction of content movement would again be directed toward the separation between the first and second groups of content. In this instance, the groups of content would be pushed together by the movement of the content.

Accordingly, the apparatus 50 of the embodiment of FIG. 8 may include means, such as a processor 70, for increasing the gap between the first and second groups of content in an instance in which the indication that the content is to be moveddefines a direction of content movement that pulls one group away from the other group. See operation of 108 of FIG. 8. In this regard, an increase in the gap between the first and second groups of content does not imply that a gap existed between the first and second groups of content prior to the movement of the content while the content was displayed in accordance with the predefined spatial relationship. Instead, the increase in the gap between the first and second groups of content may be the creation of a new gap in one embodiment or the enlargement of an existing gap in another embodiment. Thus, the content displayed in FIGS. 5 and 6 results from an instance in which the indication that the content is to be moveddefines a direction of content movement that pulls one group away from the other group such that a gap is created between the first and second groups during the movement of the content.

Additionally, the apparatus 50 of this embodiment may include means, such as the processor 70 or the like, for causing the groups of content to be at least partially overlapped in response to receiving an indication that the content is to be movedin a direction of content movement that pushes one group toward the other group. See operation 110 of FIG. 8. As shown in FIG. 7, for example, the receipt of an indication that one group is to be pushed toward the other group may cause the first and second groups of content to be at least partially overlapped. Thus, the manner in which the spatial relationship between the groups of content is changed during the movement of the content may provide information regarding the manner in which the groups of content are being pulled or pushed during the movement.

As shown by comparison of FIGS. 5 and 6, the change in the spatial relationship may vary depending upon, for example, differences in the manner in which the content is moved. By way of example, the apparatus 50 may include means, such as the processor 70, for increasing the gap between the groups of content in a manner that has a direct relationship to the speed, acceleration or the like with which the content is being moved. As such, the creation of a larger gap in the embodiment of FIG. 5 than in the embodiment of FIG. 6 may illustrate that the content is being scrolled at a faster rate in the embodiment in FIG. 5 than in the embodiment of FIG. 6 even though the first and second groups of content are being pulled apart from one another in both instances. Similarly, the amount of overlap between the groups of content may also be dependent upon the speed, acceleration or the like with which the content is moved. For example, greater amounts of overlap may correspond to greater rates of scrolling and lesser amounts of overlap may correspond to lesser rates of scrolling. As such, the degree or extent to which the spatial relationship between the groups of content changes may also provide information regarding the movement of the content, such as the speed, acceleration or the like at which the movement occurs.

The change in the spatial relationship between the groups of content may also be optionally varied based upon other factors. For example, the relative size of the groups, such as in terms of the number of content items, the size of the files associated with the content items or the like, may cause the spatial relationship between the groups of content to vary. In one embodiment, the spatial relationship of a group with a larger number of content items relative to another group of content items may be varied to a greater degree, such as by creating a larger gap or a greater overlap, than smaller groups of content items subjected to the same type of movement.

Still further, the change in the spatial relationship between the groups of content may also or alternatively be based upon the relatedness of the groups of content. In this embodiment, groups of content that are more closely related may experience a smaller change in spatial relationship than groups of content that have a more remote (or less closely related) relationship. For example, in an embodiment in which the content is a map of the world, states or provinces may be considered more closely related than countries such that states or provinces experience less change in their spatial relationship while countries experience more change in their spatial relationship. In another example embodiment in which the content is photographs, photographs taken in New York City and Boston may be considered more closely related than photographs taken in New York City and Tokyo such that the groups of photographs taken in New York City and Boston may experience less change in their spatial relationship while the groups of photographs taken in New York City and Tokyo experience more change in their spatial relationship.

The apparatus 50 of one embodiment may also include means, such as the processor 70 or the like, for causing information to be displayed concurrent with the change in the spatial relationship that relates to the different groups of content or the underlying rationale for the change in the spatial relationship. In an embodiment in which a gap is created between two groups of content during movement of the content, information could be displayed within or otherwise associated with the gap that explains why the two groups of content are distinct from one another, such as the dates of the photographs in an embodiment in which images are grouped based upon the date of capture.

As shown in operation 112 of FIG. 8, the apparatus 50 also includes means, such as the processor 70 or the like, for causing the at least two groups of content to return to the predefined spatial relationship following the content movement, such as shown in FIG. 4 and as described above in conjunction with operation 96 of FIG. 3. See operation 112 of FIG. 8. Upon returning to the predefined spatial relationship, the content may be displayed again following the movement of the content in the same manner as that in which the content was initially presented. However, by altering the spatial relationship between the groups of content during the movement of the content, the user may more readily identify the different groups of content which may, in turn, facilitate the user's review of the content, cessation of the movement of the content and the selection of a content item. In one embodiment, the apparatus 50, such as the processor 70 or the like, may cause an indication, such as a highlighted line or the like, to be displayed between the two groups of content even once the two groups of content have returned to the predefined spatial relationship, thereby providing a more lasting reminder of the grouping of the content. This indication may fade over time or otherwise be eliminated after a predefined period of time.

As described above, FIGS. 4 and 8 are flowcharts of a method and program product according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowcharts' block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts' block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   causing a display of content, wherein the content that is displayed comprises a plurality of content items and is divided into at least two groups having a predefined spatial relationship therebetween;
   enabling movement of the content including movement of each of the at least two groups in a same direction;
   causing, via a processor, a spatial relationship of the at least two groups of content to change from the predefined spatial relationship while the content including each of the at least two groups is moved in the same direction, wherein causing the spatial relationship of the at least two groups of content to change comprises causing the spatial relationship of the at least two groups of content to change by increasing one of a gap or an overlap between the at least two groups of content by an amount that varies based upon a direct relationship to a speed or acceleration with which the content including each of the at least two groups is moved in the same direction such that movement at a greater speed or acceleration results in a larger gap or overlap than movement at a lesser speed or acceleration and further such that movement at the lesser speed or acceleration results in a larger gap or overlap than the predefined spatial relationship between the at least two groups in an absence of movement; and causing the at least two groups of content to return to the predefined spatial relationship by decreasing the gap or the overlap between the at least two groups of content following the movement of the content,
    wherein a spatial relationship between the content items within each respective group is separately maintained constant prior to, during and following movement of the at least two groups of content such that the content items of a respective group have the same spatial relationship with other content items of the respective group before, during and following movement of the at least two groups of content.

2. A method according to claim 1 wherein causing the spatial relationship of the at least two groups of content to change from the predefined spatial relationship while the content is moved comprises increasing a gap between the at least two groups of content while the content is moved.

3. A method according to claim 2 further comprising:
    receiving a selection of a first group of content; and
    receiving an indication that the content is to be moved in a direction that pulls the first group away from a second group of content,
    wherein increasing the gap comprises increasing the gap between the first and second groups of content in response to receiving the indication that the content is to be moved in a direction that pulls the first group away from the second group of content.

4. A method according to claim 1 wherein causing the spatial relationship of the at least two groups of content to change from the predefined spatial relationship while the content is moved comprises causing the at least two groups of content to be at least partially overlapped while the content is moved.

5. A method according to claim 4 further comprising:
    receiving a selection of a first group of content; and
    receiving an indication that the content is to be moved in a direction that pushes the first group toward a second group of content,
    wherein causing the at least two groups of content to be at least partially overlapped comprises causing the at least two groups of content to be at least partially overlapped in response to receiving the indication that the content is to be moved in a direction that pushes the first group toward the second group of content.

6. A method according to claim 1 wherein the content comprises a plurality of content items, and wherein the content that is displayed is divided into at least two groups of content items having a predefined spatial relationship therebetween.

7. A method according to claim 1 wherein causing the spatial relationship of the at least two groups of content to change comprises causing the spatial relationship of the at least two groups of content to change based upon a relative size of the at least two groups.

8. A method according to claim 1 wherein causing the spatial relationship of the at least two groups of content to change comprises causing the spatial relationship of the at least two groups of content to change based upon a relatedness of the at least two groups.

9. An apparatus comprising at least one processor and at least one memory including computer program code, the at least one memory and the computer program code configured to, with the processor, cause the apparatus to at least:
    cause a display of content, wherein the content that is displayed comprises a plurality of content items and is divided into at least two groups having a predefined spatial relationship therebetween;
    enable movement of the content including movement of each of the at least two groups in a same direction;
    cause a spatial relationship of the at least two groups of content to change from the predefined spatial relationship while the content including each of the at least two groups is moved in the same direction; and
    cause the at least two groups of content to return to the predefined spatial relationship by decreasing a gap or an overlap between the at least two groups of content following the movement of the content,
    wherein the at least one memory and the computer program code are configured to, with the processor, cause the apparatus to cause the spatial relationship of the at least two groups of content to change by causing the spatial relationship of the at least two groups of content to change by increasing one of the gap or the overlap between the at least two groups of content by an amount that varies based upon a direct relationship to a speed or acceleration with which the content including each of the at least two groups is moved in the same direction such that movement at a greater speed or acceleration results in a larger gap or overlap than movement at a lesser speed or acceleration and further such that movement at the lesser speed or acceleration results in a larger gap or overlap than the predefined spatial relationship between the at least two groups in an absence of movement,
    wherein the spatial relationship between the content items within each respective group is separately maintained prior to, during and following movement of the at least two groups of content such that the content items of a respective group have the same spatial relationship with other content items of the respective group before, during and following movement of the at least two groups of content.

10. An apparatus according to claim 9 wherein the at least one memory and computer program code are configured to, with the at least one processor, cause the apparatus to cause the spatial relationship of the at least two groups of content to change from the predefined spatial relationship while the content is moved by increasing a gap between the at least two groups of content while the content is moved.

11. An apparatus according to claim 10 wherein the at least one memory and computer program code are further configured to, with the at least one processor, cause the apparatus to:
    receive a selection of a first group of content; and
    receive an indication that the content is to be moved in a direction that pulls the first group away from a second group of content,
    wherein the at least one memory and computer program code are configured to, with the at least one processor, cause the apparatus to increase the gap by increasing the gap between the first and second groups of content in response to receiving the indication that the content is to be moved in a direction that pulls the first group away from the second group of content.

12. An apparatus according to claim 9 wherein the at least one memory and computer program code are configured to, with the at least one processor, cause the apparatus to cause the spatial relationship of the at least two groups of content to change from the predefined spatial relationship while the content is moved by causing the at least two groups of content to be at least partially overlapped while the content is moved.

13. An apparatus according to claim 12 wherein the at least one memory and computer program code are configured to, with the at least one processor, cause the apparatus to:
receive a selection of a first group of content; and
receive an indication that the content is to be moved in a direction that pushes the first group toward a second group of content,
wherein the at least one memory and computer program code are configured to, with the at least one processor, cause the apparatus to cause the at least two groups of content to be at least partially overlapped by causing the at least two groups of content to be at least partially overlapped in response to receiving the indication that the content is to be moved in a direction that pushes the first group toward the second group of content.

14. An apparatus according to claim 9 wherein the content comprises a plurality of content items, and wherein the content that is displayed is divided into at least two groups of content items having a predefined spatial relationship therebetween.

15. An apparatus according to claim 9 wherein causing the at least one memory and the computer program code are further configured to, with the processor, cause the apparatus to cause the spatial relationship of the at least two groups of content to change by causing the spatial relationship of the at least two groups of content to change based upon a relative size of the at least two groups.

16. An apparatus according to claim 9 wherein causing the at least one memory and the computer program code are further configured to, with the processor, cause the apparatus to cause the spatial relationship of the at least two groups of content to change by causing the spatial relationship of the at least two groups of content to change based upon a relatedness of the at least two groups.

17. A computer program product comprising at least one non-transitory computer-readable storage medium having computer-executable program code instructions stored therein, the computer-executable program code instructions comprising program code instructions for:
causing a display of content, wherein the content that is displayed comprises a plurality of content items and is divided into at least two groups having a predefined spatial relationship therebetween;
enabling movement of the content including movement of each of the at least two groups in a same direction;
causing a spatial relationship of the at least two groups of content to change from the predefined spatial relationship while the content including each of the at least two groups is moved in the same direction, wherein causing the spatial relationship of the at least two groups of content to change comprises causing the spatial relationship of the at least two groups of content to change by increasing one of a gap or an overlap between the at least two groups of content by an amount that varies based upon a direct relationship to a speed or acceleration with which the content including each of the at least two groups is moved in the same direction such that movement at a greater speed or acceleration results in a larger gap or overlap than movement at a lesser speed or acceleration and further such that movement at the lesser speed or acceleration results in a larger gap or overlap than the predefined spatial relationship between the at least two groups in an absence of movement; and
causing the at least two groups of content to return to the predefined spatial relationship by decreasing the gap or the overlap between the at least two groups of content following the movement of the content,
wherein the spatial relationship between the content items within each respective group is separately maintained prior to, during and following movement of the at least two groups of content such that the content items of a respective group have the same spatial relationship with other content items of the respective group before, during and following movement of the at least two groups of content.

18. A computer program product according to claim 17 wherein the program code instructions for causing the spatial relationship of the at least two groups of content to change from the predefined spatial relationship while the content is moved comprise program code instructions for increasing a gap between the at least two groups of content while the content is moved.

19. A computer program product according to claim 18 wherein the computer-executable program code instructions further comprise program code instructions for:
receiving a selection of a first group of content; and
receiving an indication that the content is to be moved in a direction that pulls the first group away from a second group of content,
wherein increasing the gap comprises increasing the gap between the first and second groups of content in response to receiving the indication that the content is to be moved in a direction that pulls the first group away from the second group of content.

20. A computer program product according to claim 17 wherein the program code instructions for causing the spatial relationship of the at least two groups of content to change from the predefined spatial relationship while the content is moved comprise program code instructions for causing the at least two groups of content to be at least partially overlapped while the content is moved.

21. A computer program product according to claim 20 wherein the computer-executable program code instructions further comprise program code instructions for:
receiving a selection of a first group of content; and
receiving an indication that the content is to be moved in a direction that pushes the first group toward a second group of content,
wherein causing the at least two groups of content to be at least partially overlapped comprises causing the at least two groups of content to be at least partially overlapped in response to receiving the indication that the content is to be moved in a direction that pushes the first group toward the second group of content.

\* \* \* \* \*